United States Patent [19]

Gagner

[11] Patent Number: 4,881,782
[45] Date of Patent: Nov. 21, 1989

[54] UNLOADING SPOUT FOR GRAIN TRUCKS

[76] Inventor: Charles A. Gagner, Rte. 1, Box 117, Brooks, Minn. 56715

[21] Appl. No.: 194,521

[22] Filed: May 16, 1988

[51] Int. Cl.$^4$ .............................................. B60P 1/00
[52] U.S. Cl. .......................................... 298/7; 193/5
[58] Field of Search ................... 193/2 A, 5; 222/567, 222/568, 573, 574; 298/7; 414/299, 328

[56] References Cited

U.S. PATENT DOCUMENTS

| | | | |
|---|---|---|---|
| 169,171 | 10/1875 | Hoch | 298/7 |
| 3,095,073 | 6/1963 | Larson et al. | 193/5 X |

Primary Examiner—Robert J. Spar
Assistant Examiner—Janice Krizek
Attorney, Agent, or Firm—Kinney & Lange

[57] ABSTRACT

An unloading spout for grain trucks includes two spout wings each hinged to the rear wall of a grain truck on opposite sides of its unloading port, and two spout floors each hinged on outward edges to a bottom edge of one of the wings. The loading spout is held in operable position by bolting overlapping inward edges of the floors to each other. When not in use, the grain spout is stowed by unbolting the floors, folding them into parallel relation to the wings, and folding the wings into parallel relation with the truck wall. The wings and floors are then fastened to the truck wall in stowed condition.

10 Claims, 4 Drawing Sheets

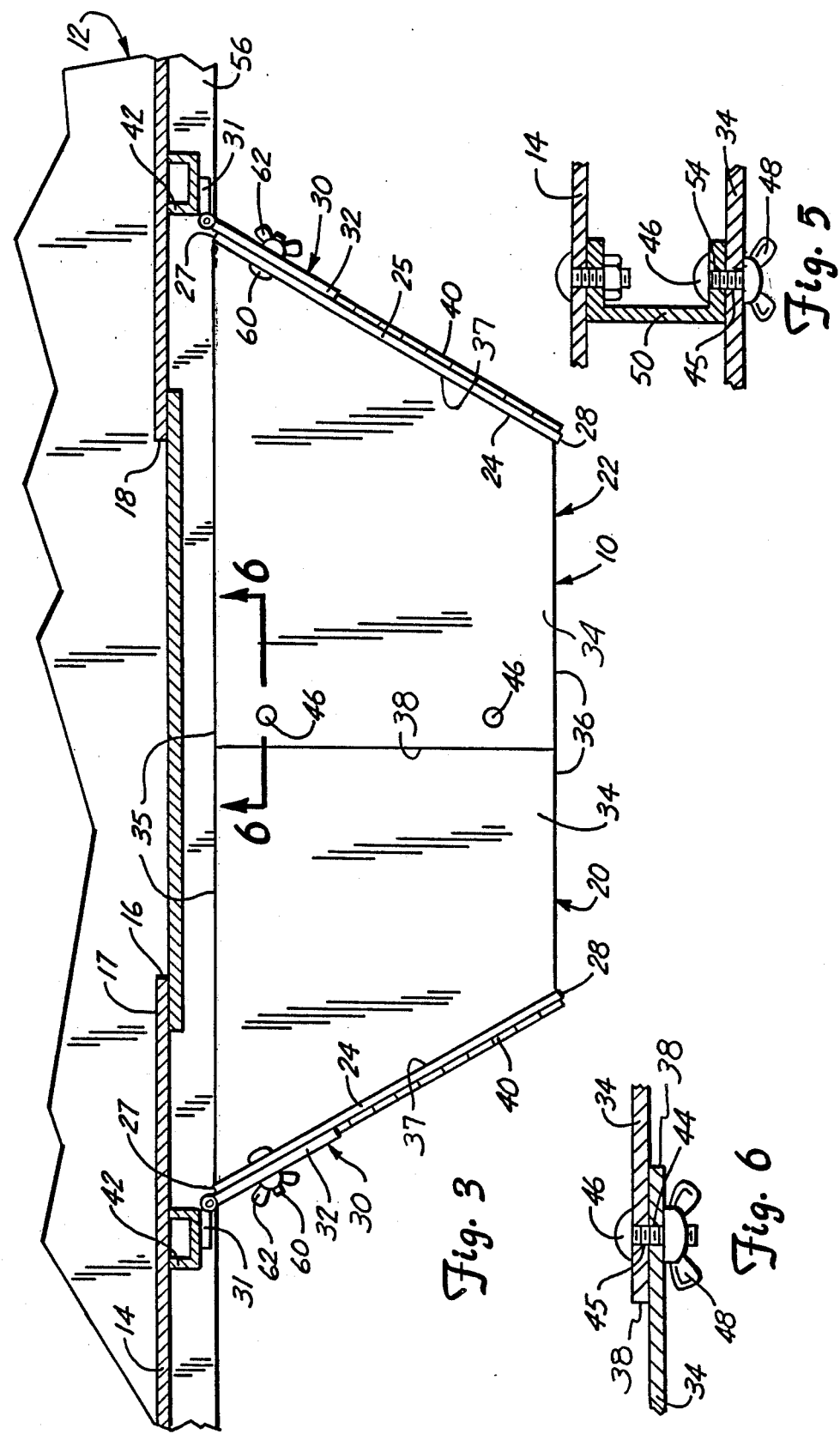

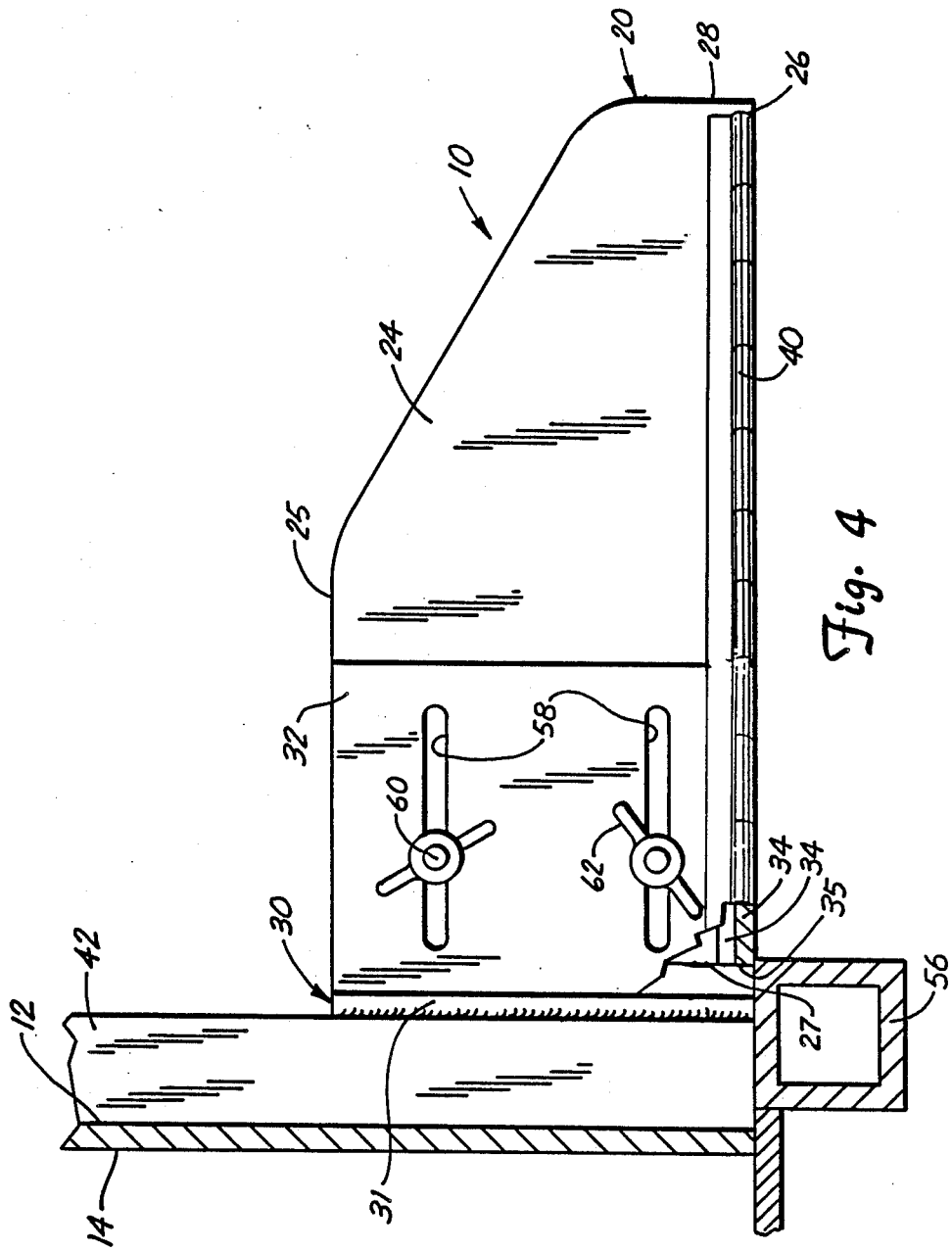

UNLOADING SPOUT FOR GRAIN TRUCKS

BACKGROUND OF THE INVENTION

1. Field of the Invention

This invention has relation to the rapid unloading of grain bins and specifically truck mounted grain bins which can sometimes be unloaded into an elevator pit, for example, by simply opening a grain unloading port in the rear wall of a truck mounted grain bin, elevating the bin to discharge toward the rear, letting the grain fall where it may; but must sometimes be unloaded into a more confined space such as a hopper feeding an auger leg, for example. In the latter situation, the flow from the bin needs to be configured to direct the grain into the more restricted opening.

2. Description of the Prior Art

It is known to attach a spout to the back wall of a grain truck to confine the direction of flow of grain to a small area such as a hopper. Such spouts have been carried with grain trucks separately to be fastened into place when needed, and some such spouts have been permanently fastened to the back wall of the grain truck bin.

What was needed before the present invention was an unloading spout for grain trucks which can be permanently affixed to the truck to fold into a stowed condition completely out of the way when traveling and when it is desirable to unload grain from the truck into a bulk storage location such as an elevator pit, for example. Such a spout should then be rapidly convertible to an operable position to allow unloading of the grain truck from a spout more narrowly confining the direction of flow from the grain truck unloading port.

SUMMARY OF THE INVENTION

An unloading spout is for use with a mobile bin holding discrete flowable material such as an over the road grain truck, for example. The mobile bin or grain truck will have at least one upright bin wall or rear grain truck wall provided with an unloading port partially bounded by first and second generally upright spaced-apart bin port side edges.

The unloading spout of the invention includes a first spout means including a first spout wing partially defined by top, bottom, leading and trailing edges, a first hinge means fastening the trailing edge of the first wing to the upright bin wall adjacent the first upright bin port side edge to pivot on a generally upright axis between an assembled operable position extending outwardly from the bin wall to confine the direction of flow of the grain from the port, and a stowed position generally parallel to the bin wall. The first spout means also includes a first spout floor partially defined by a leading edge, a trailing edge, an outward edge and an inward edge; and second hinge means fastening the first spout floor outward edge to the first spout wing bottom edge to pivot between an assembled operable position extending outwardly from the bin wall and in generally normal relation to the first spout wing; and a stowed position wherein the first spout floor is in generally parallel relation to the first spout wing.

First releasable means is provided adjacent the truck rear wall to retain the first spout wing and the first spout floor in stowed position. A second spout means is connected to the bin wall adjacent the second bin port side edge in position to confine the direction of flow of such material from the discharge port; and means is provided to support the inward edge of the first spout floor with respect to the second spout means in assembled operable position so that all of the material flowing from the unloading port is confined by he second spout means and by the first spout wing and first spout floor of the first spout means to flow from the spout in a predetermined discharge configuration.

In the form of the invention as shown, the second spout means is a mirror image of the first spout means, and the means to support the inward edge of the first spout floor also similarly supports the inward edge of the second spout floor and includes fastening means to releasably fasten the inward edge portions of these two floors to each other.

In order that one size of the unloading spout of the present invention can accommodate installation to a large number of differently shaped grain bin walls and discharge ports, the location of the various fastening means are determined in the field at the time of the installation of the spout. A method for accomplishing this includes the steps of affixing a first hinge butt of the hinge which is connected to the trailing edge of each wing to the bin wall so that each first hinge butt is in parallel relation to the other on opposite sides of the bin wall unloading port; drilling at least one floor fastening bolt hole in each first and second spout floor in aligned relation with each other when the wings and floor of the first and second spout means are in assembled operable relationship; folding each spout floor into parallel relation to its spout wing and swinging each spout wing into parallel relation to the bin wall in direction away from the bin port and determining the position at that time of each bin floor fastening bolt hole with respect to the bin wall; installing a stowage positioning means on the bin wall at each side of the bin port in position aligned with the determined stowed position of a bin floor fastening bolt hole; and installing a bolt or other fastening device through each bin floor fastening hole to attach it to its stowage positioning means.

BRIEF DESCRIPTION OF THE DRAWINGS

FIG. 3 is an enlarged horizontal sectional view taken on the line 3—3 in FIG. 1 illustrating a top plan view of the spout in operable condition;

FIG. 4 is an enlarged vertical sectional view taken on the line 4—4 in FIG. 1 and showing the spout of the present invention in side elevation;

FIG. 5 is an enlarged horizontal sectional view taken on the line 5—5 in FIG. 1, but showing the association of the parts as they would appear if they were in the stowed position; and FIG. 6 is an enlarged fragmentary vertical sectional view taken on the line 6—6 in FIG. 3.

DETAILED DESCRIPTION OF THE PREFERRED EMBODIMENT

Figure 1:
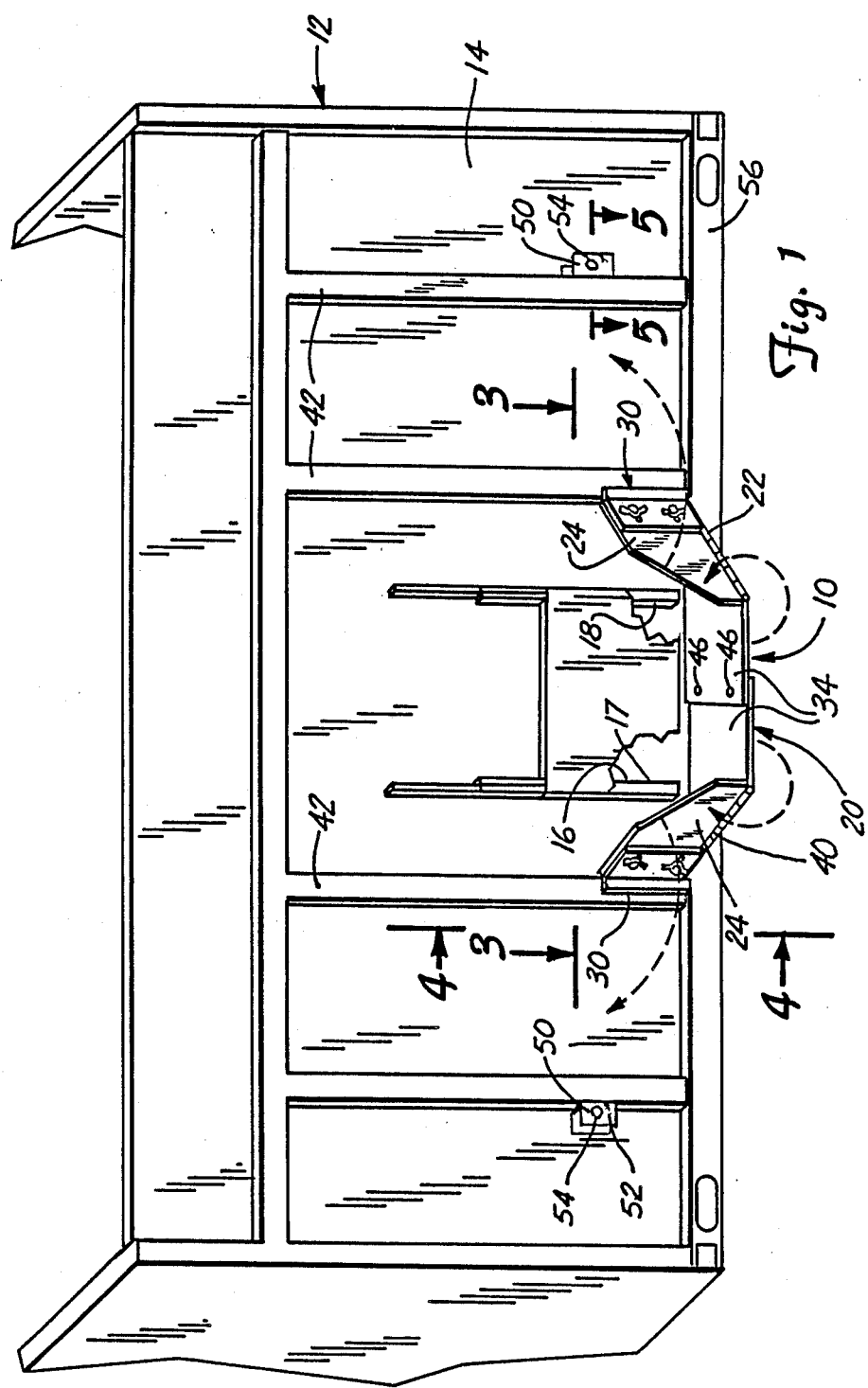
FIG. 1 is a perspective view of a rear end portion of a mobile bin such as a grain truck bin showing the bin in slightly elevated position for the discharging of grain or other flowable material therefrom and showing a grain spout of the present invention in operable position with respect thereto.

An unloading spout 10 for grain trucks is for use in unloading a bin 12 holding discrete flowable material such as grain, shelled corn, sand or the like. One upright bin wall such as rear wall 14 of the truck mounted bin 12 is provided with an unloading port 16 having first and second generally upright, spaced-apart, bin port side edges 17 and 18.

The unloading spout itself consists of a first spout means 20 and an identical but mirror image second spout means 22. The elements of each spout means will be described in connection with the first spout means, but equivalent elements of the second spout means will be given identical numbers.

The first spout means 20 includes a first spout wing 24 partially defined by a top edge 25, a bottom edge 26, a leading edge 27 and a trailing edge 28. A first hinge means 30 includes a first hinge butt 31 and a second adjustably mounted hinge butt 32. This hinge can preferably be a piano-type hinge.

A first spout floor 34 is partially defined by a leading edge 35, a trailing edge 36, an outward edge 37, and an inward edge 38. The bottom edge 26 of spout wing 24 is connected to the outward edge 37 of the spout floor 34 by a second hinge means or piano-type hinge 40, in the form of the invention as shown.

Because there are wide varieties of shape, dimensions, configurations of grain truck rear walls and discharge ports, it is anticipated that it will often be advisable to have a particular unloading spout 10 custom installed to accommodate each different grain truck rear wall. In the particular structure herein illustrated, first hinge butts 31 are shown as being fastened, as by welding for example, to vertical truck rear wall reinforcing channels 42,42. When this has been accomplished, the first and second spout means 20 and 22, respectively, will be moved to operable position as seen in FIGS. 1, 3 and 4, and a pair of first spaced-apart spout floor bolt holes 44,44 are drilled through the first floor, and a pair of spaced-apart second spout floor bolt holes 45,45 are drilled through the second spout floor in precise alignment with the bolt holes 44,44. The amount of overlap of the first spout floor 34 and the second spout floor 34 will be determined by the spacing needed between the mounting of the first hinge means butts 31 and 31. As seen in FIG. 6, floor fastening bolts 46 and floor fastening wing nuts 48 are provided to maintain the spout in operable condition by firmly fastening the spout floors 34 and 34 to each other.

With the parts in this operable position, the unloading spout 10 of the present invention can be used for its intended purpose upon the opening or at least partial opening of the unloading port 16 and the elevating of the front end (not shown) of the truck mounted grain bin 12.

Figure 2:
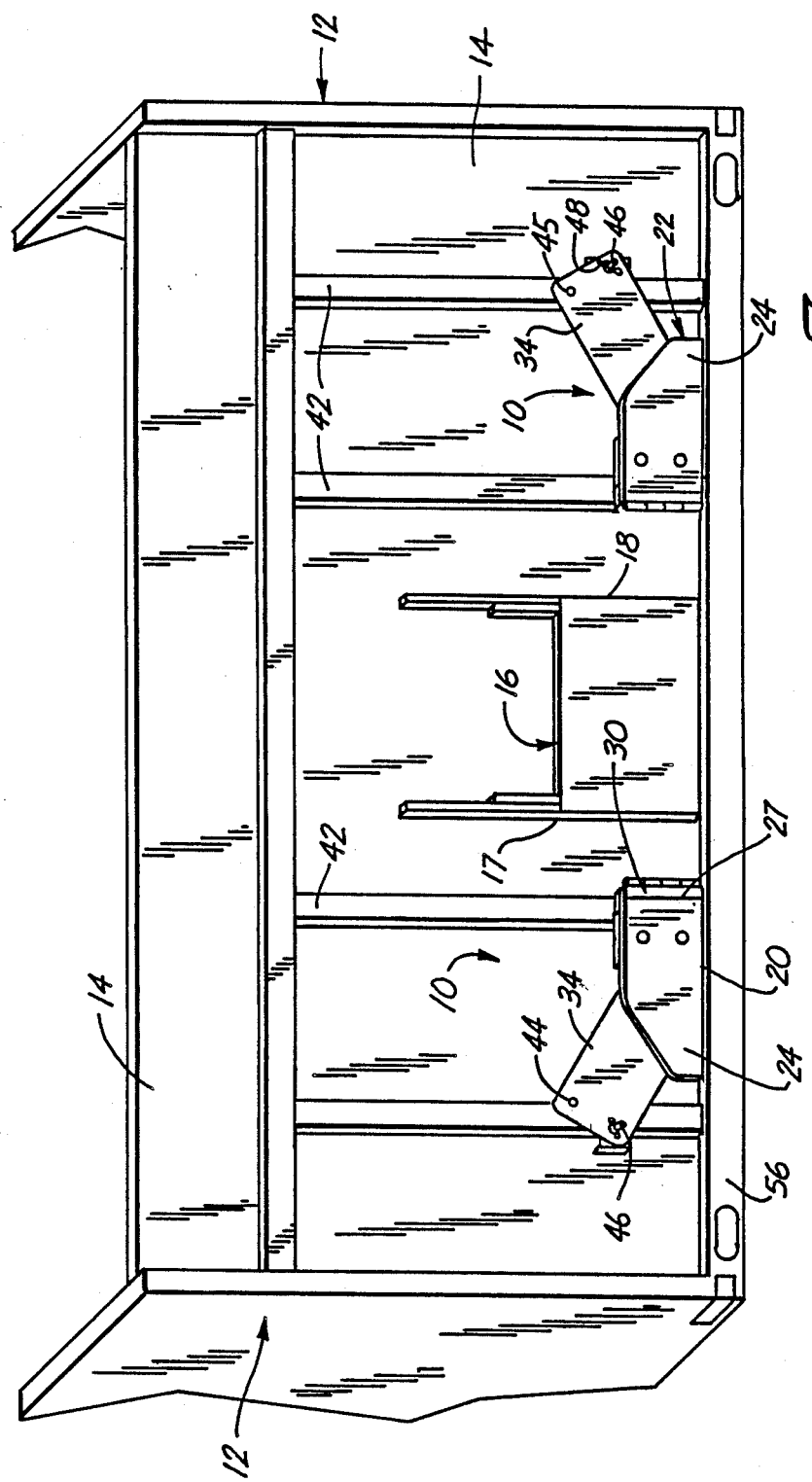
FIG. 2 is a view similar to FIG. 1 but showing the grain spout of the present invention in its stowed position.

To complete the installation of the unloading spout of the invention, however, the floor fastening bolts 46 and the fastening nuts 48 will be removed and retained, and each spout floor 34 will be allowed to drop to vertical position beneath its spout wing 24, and then swung up outwardly into parallel relationship to that wing. The spout wings will then be swung back against the truck wall 14, all as indicated by the arrows in FIG. 1. The parts will have position as seen in FIG. 2. When in this position, the location of either one of the bolt holes 44,44 and either one of the bolt holes 45,45 will be determined and their positions scribed or otherwise indicated on the truck upright wall 14.

In the form of the invention as shown, a pair of stowage positioning brackets 50,50 are mounted in alignment with one of the holes 44 and one of the holes 45 to the truck wall 14. This can be done by welding or by simply bolting the stowage positioning brackets to the truck wall as seen at the top of FIG. 5. Each stowage positioning bracket 50 is provided with a stowage leg 52, and each stowage leg is provided with a floor fastening bolt receiving opening 54, the stowage positioning brackets 50 having been installed to position that bolt receiving opening 54 to be in precise alignment with one of the bolt holes 44 or one of the bolt holes 45. As seen in FIG. 5, the same two floor fastening bolts 46 and floor fastening wing nuts 48 are utilized, one on each side, to maintain the unloading spout in its stowed position for over the road travel and for maneuvering of the truck preparatory to use. It is evident that, when the grain truck bin 12 is to be unloaded over a bulk unloading facility such as an elevator leg, the spout 10 of the invention will be left in the stowed position.

In FIG. 2, and as described above, each spout floor 34 is between its spout wing 24 and the wall 14 when the spout is in stowed position. The spout wing 24 can also be positioned between the spout floor 34 and the wall 14 within the spirit and scope of the invention.

In circumstances such as illustrated in FIG. 4 where a horizontal rear floor beam 56 at the rearmost edge of the grain truck bin 12 extends out beyond the rear wall 14 and even beyond the rear wall reinforcing channels 42, some room for adjustment will be needed to insure that the leading edges 35 of the first and second spout floors 34,34 fit tightly against the truck so that there is no loss of grain during the unloading process. Here, where the first hinge butts 31 are shown to be welded to the outer surface of the vertical rear wall reinforcing channels 42, the positioning of the spout wings 24 is adjusted outwardly in order that the leading edges of the spout floors can terminate in contact with the outer edge of the horizontal rear floor beam 56. This adjustment is accommodated by the provision of a pair of horizontal slots 58,58 in each of the second adjustable hinge butts 32,32. Stud bolts 60,60 extend integrally outwardly from each wing through these slots 58, and wing nuts 62 are provided to fixedly clamp the hinge butts 32 to their associated spout wings 24.

Once this final installation has been made, no further adjustment is necessary during the life of the truck bin, so it is perfectly feasible to weld the second hinge butts 32 to the spout wings 24, thus doing away with the need for the horizontal slots 58, stud bolts 60 and wing nuts 62.

In point of fact, the entire installation can be left in place indefinitely regardless of the use to which the truck is put. Should there be no prospect for using the unloading spout of the invention in the future, there is no need or reason to remove it from the grain truck as it is not in the way for any other use. Also, since the two floor fastening bolts 46 and the floor fastening wing nuts 48 are each used whether the spout is in its stowed or operable position, and since these nuts are removed when the positions are to be changed and immediately installed again when the alternate position has been achieved, there is no opportunity for these nuts and bolts to become lost.

Although the present invention has been described with reference to preferred embodiments, workers skilled in the art will recognize that changes may be made in form and detail without departing from the spirit and scope of the invention.

What is claimed is:

1. An unloading spout for use with a mobile bin holding discrete flowable material, said bin having at least one upright bin wall provided with an unloading port partially bounded by first and second generally upright, spaced-apart, bin port side edges; said unloading spout including:
   (a) a first spout means including:
      (1) a first spout wing partially defined by top, bottom, leading and trailing edges,
      (2) first hinge means fastening the trailing edge of said first wing to said upright bin wall adjacent said first upright bin port side edge to pivot on a generally upright axis between an assembled operable position extending outwardly from the bin wall to confine the direction of flow of such material from said port, and a stowed position generally parallel to the bin wall,
      (3) a first spout floor partially defined by a leading edge, a trailing edge, an outward edge and an inward edge, and
      (4) second hinge means fastening the first spout floor outward edge to the first spout wing bottom edge to pivot between an assembled operable position extending outwardly from the bin wall and in generally normal relation to the first spout wing, and a stowed position wherein the first spout floor is in generally parallel relation to the first spout wing;
   (b) first releasable means to retain the first spout wing and first spout floor in said stowed position;
   (c) second spout means connected to the bin wall adjacent said second bin port side edge in position to confine the direction of flow of such material from said port; and
   (d) means to support the inward edge of the first spout floor with respect to the second spout means in assembled operable position such that all such material flowing from said unloading port is confined by the second spout means and by the first spout wing and first spout floor of the first spout means to flow from the spout in a predetermined discharge configuration.

2. The unloading spout of claim 1 wherein:
   (e) said first releasable means to retain said first wing and said first floor in said stowed position includes fastening means to fasten the first spout floor to said bin wall when said first floor is folded so that it is parallel to the first wing and the first wing is swung to parallel relation with respect to the bin wall.

3. The unloading spout of claim 1 wherein:
   (e) said second spout means includes
      (1) a second spout wing partially defined by top, bottom, leading and trailing edges,
      (2) third hinge fastening the trailing edge of said second wing to said upright bin wall adjacent said second upright bin port side edge to pivot on a generally upright axis between an assembled operable position extending outwardly from the bin wall to confine the direction of flow of such material from said port, and a stowed position generally parallel to the bin wall,
      (3) a second spout floor partially defined by a leading edge, a trailing edge, an outward edge, and an inward edge, and
      (4) fourth hinge means fastening the second spout floor outward edge to the second spout wing bottom edge to pivot between an assembled operable position extending outwardly from the bin wall and in generally normal relation to the second spout wing, and a stowed position wherein the second spout floor is in generally parallel relation to the second spout wing;
   (f) the means to support the inward edge of the first spout floor also similarly supports the inward edge of the second spout floor and includes fastening means to releasably fasten inward edge portions of these two floors to each other; and
   (g) second releasable means is provided to retain the second spout wing and second spout floor in said stowed position.

4. The unloading spout of claim 3 wherein:
   (h) said first and second releasable means to retain said first and second wings and said first and second floors in said stowed position each include fastening means to fasten its associated spout floor to the bin wall when that floor is folded so that it is parallel to its attached wing and that wing is swung into parallel relation to the bin wall.

5. The unloading spout of claim 4 wherein:
   (i) the fastening means to releasably fasten inward edge portions of the first and second spout floors to each other includes:
      (1) at least one spout floor bolt hole provided through each floor in mutual alignment with the hole in the other floor when the first and second spout means are both in said assembled operable position,
      (2) a floor fastening bolt extending through each pair of aligned bolt holes, and
      (3) a floor fastening nut holding each bolt in place.

6. The unloading spout of claim 5 wherein:
   (j) there are at least two floor fastening bolt holes through each floor forming at least two mutually aligned pairs of floor fastening holes receiving at least two bolts held by two nuts.

7. The unloading spout of claim 6 wherein:
   (k) the first and second releasable means for retaining the first and second spout wings and spout floors in stowed position includes:
      (1) first and second stowage positioning brackets each fastened on the bin wall and each having a spout stowage leg in spaced, generally parallel relation to the bin wall, each stowage leg having a bolt hole therethrough of size to receive one of said floor fastening bolts and each bracket being so positioned that its stowage leg bolt hole is in alignment with one of the spout floor bolt holes when each spout wing and spout floor is placed in its stowed position,
      (2) said floor fastening bolts extending through each spout stowage leg bolt hole and its aligned spout floor bolt hole, and
      (3) one of said floor fastening nuts releasably holding each of said floor fastening bolts in place.

8. The unloading spout of claim 7 wherein:
   (1) each of said floor fastening nuts is a wing nut.

9. The unloading spout of claim 5 wherein:
   (h) the four hinge means each include a piano-type hinge having first and second hinge butts.

10. The unloading spout of claim 3 wherein:
   (h) the first and third hinge means each include a piano-type hinge having a first hinge butt fixedly attached to the bin wall and a second hinge butt adjustably attachable to a trailing edge portion of its spout wing to permit limited adjustment of its wing in direction toward and away from the upright pivot axis of the hinge.

* * * * *

UNITED STATES PATENT AND TRADEMARK OFFICE
CERTIFICATE OF CORRECTION

PATENT NO. : 4,881,782
DATED : November 21, 1989
INVENTOR(S) : Charles A. Gagner It is certified that error appears in the above-identified patent and that said Letters Patent is hereby corrected as shown below:

Column 6, line 51, delete "(2) said floor" and insert --(2) one of said floor--.

Signed and Sealed this

Ninth Day of October, 1990

*Attest:*

HARRY F. MANBECK, JR.

*Attesting Officer*     *Commissioner of Patents and Trademarks*